(12) United States Patent
Secrest et al.

(10) Patent No.: US 6,696,100 B2
(45) Date of Patent: Feb. 24, 2004

(54) METHOD OF DECORATING A CERAMIC ARTICLE

(75) Inventors: Patricia C. Secrest, Lakewood, OH (US); Robert P. Blonski, North Royalton, OH (US); Ivan H. Joyce, Hudson, OH (US); Juan Carlos Gallart, Valencia (ES); John J. Welch, Cleveland, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/729,650

(22) Filed: Dec. 4, 2000

(65) Prior Publication Data

US 2002/0068131 A1 Jun. 6, 2002

(51) Int. Cl.$^7$ ................................................ B05D 3/02
(52) U.S. Cl. ........................................................ 427/226
(58) Field of Search ......................................... 427/226

(56) References Cited

U.S. PATENT DOCUMENTS

| 4,162,986 A | | 7/1979 | Alkaitis et al. ............. 252/33.2 |
| 4,277,537 A | * | 7/1981 | Woodman .............. 106/287.18 |
| 5,185,035 A | | 2/1993 | Brown et al. ............. 106/31 R |
| 5,273,575 A | | 12/1993 | de Saint Romain ....... 106/23 B |
| 5,498,444 A | | 3/1996 | Hayes ........................ 427/162 |
| 5,707,684 A | | 1/1998 | Hayes et al. ................. 427/162 |
| 5,714,236 A | | 2/1998 | Withington et al. ......... 428/195 |
| 5,772,106 A | | 6/1998 | Ayers et al. ................. 228/254 |
| 5,800,600 A | | 9/1998 | Lima-Marques et al. 106/31.29 |
| 5,897,912 A | | 4/1999 | Shaikh ........................ 427/79 |

OTHER PUBLICATIONS

Copy of application Ser. No. 09/479350 filed Jan. 7, 2000 entitled "Individual Inks and an Ink Set for Use in the Color Ink Jet Printing of Glazed Ceramic Tiles and Surfaces".

* cited by examiner

*Primary Examiner*—Shrive P. Beck
*Assistant Examiner*—Michael Cleveland
(74) *Attorney, Agent, or Firm*—Rankin, Hill, Porter & Clark LLP

(57) ABSTRACT

The present invention provides a method of decorating a ceramic article including: providing an ink composition including a metallic soap, the ink composition being a viscous oil or waxy solid at about 25° C.; heating the ink composition to reduce its viscosity to less than about 40 centipoise; depositing micro-droplets of the heated ink composition upon the ceramic article; and firing the ceramic article in an oxidizing atmosphere. In the most preferred embodiment of the invention, the ink composition is substantially solvent-free.

12 Claims, No Drawings

METHOD OF DECORATING A CERAMIC ARTICLE

FIELD OF THE INVENTION

The present invention provides a method of decorating a ceramic article. More particularly, the present invention provides a method of decorating a ceramic article using a heated ink composition comprising a metallic soap.

BACKGROUND OF THE INVENTION de Saint Romain, U.S. Pat. No. 5,273,575, Withington et al., U.S. Pat. No. 5,714,236, and pending U.S. application Ser. No. 09/479,350, now U.S. Pat. No. 6,402,823 each discloses ink compositions that generally consist of solutions of soluble metallic salts dissolved in one or more solvents. These ink compositions are intended to be applied to ceramic articles using ink jet printing techniques. Once applied in this manner, these soluble metallic salts in solution ink compositions are permitted to dry and then are fired to allow the metallic salts to decompose and form colored oxides or colored combinations with the material of the ceramic article upon which they are deposited. While these known ink compositions do make it possible to decorate ceramic articles using ink jet printing techniques, they also present some problems.

Many metallic salts, especially metallic carboxylate soaps, are viscous oils or waxy solids at room temperature (~25° C.). In order to obtain an ink composition having the appropriate physical properties, such as viscosity, to allow for ink jet application, it has been the conventional practice to dissolve and dilute the soluble metallic salts in relatively large quantities of one or more solvents. The dissolution and dilution of these metallic salts with solvent reduce the concentration of the metal in the ink composition per unit of volume, thereby lowering the intensity of the decoration that can be obtained once the ceramic article has been fired.

In addition to problems relating to the intensity of decorations formed with such ink compositions, it will be appreciated that the use of relatively large quantities of solvents in prior art ink compositions presents other disadvantages. For example, it is difficult to disperse finely divided insoluble solid additives, especially inorganic mixed metal oxide pigments, in such prior art ink compositions because the solids tend to agglomerate and form sediments upon storage. Furthermore, the use of certain solvents can raise handling and environmental concerns. A method of decorating ceramic articles is needed that can overcome the disadvantages and limitations of the prior art.

SUMMARY OF INVENTION

The present invention provides a method of decorating a ceramic article using a heated ink composition comprising a metallic soap. The method according to the invention comprises: providing an ink composition comprising a metallic soap, said ink composition being a viscous oil or waxy solid at about 25° C.; heating said ink composition to reduce its viscosity to less than about 40 centipoise; depositing micro-droplets of said heated ink composition upon said ceramic article; and firing said ceramic article in an oxidizing atmosphere to decompose the ink composition and form a coloring oxide.

The method of the present invention overcomes the limitations and disadvantages presented by prior art methods. For example, because the ink compositions used in the method according to the present invention contain relatively little, if any, solvents, the concentration of the metal applied to the ceramic article can be maintained very high, being limited only by the choice of ligand. Thus, it is possible to obtain decorations on ceramic articles that exhibit much greater intensity than was obtainable using prior art methods. Moreover, the ink compositions used in the method allow for the use of dispersed insoluble solid particles and other insoluble additives, which do not agglomerate or form sediments upon storage. Furthermore, since very little, if any, solvents are used, the method of the present invention presents far fewer handling and environmental concerns.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a method of decorating a ceramic article. The method according to the present invention comprises: providing an ink composition comprising a metallic soap, said ink composition being a viscous oil or waxy solid at about 25° C.; heating said ink composition to reduce its viscosity to less than about 40 centipoise; depositing micro-droplets of said heated ink composition upon said ceramic article; and firing said ceramic article in an oxidizing atmosphere to decompose said ink composition and form a coloring oxide.

As used throughout this specification and in the appended claims, the term "ceramic" means a material manufactured by the action of heat on earthy raw materials in which silicon and its oxide and complex compounds (silicates) occupy a predominant position. The term "ceramic" thus broadly includes: structural clay products; whiteware products such as, for example, dinnerware, porcelain, sanitary ware, and tile; glass products of all types; porcelain enamels; glass ceramics; and refractory materials. The method of the present invention is particularly useful for decorating architectural tile and dinnerware.

The ink composition used in the method according to the present invention comprises a metallic soap. Blends of two or more different metallic soaps can also be used. As used throughout this specification and in the appended claims, the term "metallic soap" means a complex between a metal ion and an organic ligand, with the complex most preferably being a metallic salt of a fatty acid. Preferably, the metallic soap comprises a complex between an ion of a metal heavier than sodium and a ligand containing at least six carbon atoms. Suitable metals include those metals which form or contribute to the formation of coloring oxides upon decomposition by heat such as, for example, aluminum, antimony, barium, bismuth, cadmium, calcium, cerium, chromium, cobalt, copper, gold, iridium, iron, lead, manganese, molybdenum, nickel, niobium, palladium, platinum, praseodymium, ruthenium, silicon, silver, tin, titanium, tungsten, vanadium, yttrium, zinc and zirconium. The preferred ligands of the metallic soap are carboxylates, with hexanoates, heptanoates, octanoates, nonanoates, decanoates, 2-ethylhexanoates, resinates, stearates, and laurates being presently most preferred.

Preferably, the ink composition used in the method according to the present invention is a viscous oil or waxy solid at about 25° C. that upon heating forms a liquid phase having a viscosity of less than about 40 centipoise, and more preferably of less than about 20 centipoise. The temperature to which the ink composition is heated is not per se critical, and will depend in large part upon the characteristics of the components of the ink composition. The temperature should be high enough to permit the ink composition to form a liquid phase having a viscosity of less than about 40 centipoise, but should be kept below the temperature at which the ink composition begins to decompose. Generally speaking, ink compositions used in the method according to the present invention will form a liquid phase having a viscosity of less than about 40 centipoise when heated to a temperature of from about 100° C. to about 250° C.

For some applications, the ink composition may consist essentially of one or a blend of "neat" metal soaps. The use of "neat" metal soaps permits the ink composition to have the highest metal concentration, which facilitates decorations having high intensity. However, for other applications, it may be desirable for the ink composition to further comprise other materials. For example, to help decrease the viscosity of the ink composition upon heating or to render two metallic soaps compatible, the ink composition may further comprise a minor amount of one or more solvents. Preferably, however, in the most preferred embodiment of the invention the ink composition is solvent-free.

The ink composition used in the method according to the present invention can comprise "overbased" metallic soaps. Overbased metallic soaps contain particles of a metallo-oxy or metal-oxo-hydroxy crystallite core, surrounded or embedded in an amorphous matrix of organic ligand groups. The crystal core phases present in overbased metal soaps, as described in Alkaitis et al., U.S. Pat. No. 4,162,986, can be $Mn_3O_4$ (spinel), CoO (cubic), $Fe_3O_4$ (spinel), CuO (triclinic), and other crystalline phases prepared from various sources of the respective metals. Where two different metals are used, atoms of the second metal can be found in the core, and thus it is possible to combine two or more different transition metals within the same crystallite core in order to produce a mixed metal oxide pigment upon firing. Alternatively, regular or overbased metallic soaps can simply be combined such as by overprinting to facilitate the production of mixed metal oxide pigments upon firing.

Each of the crystallites in an overbased metallic soap can measure from about 50 Å to about 100 Å on a side, corresponding to measurements of from about 5 nm to about 10 nm, or from about 0.005 μm to about 0.01 μm. Solid particles having these dimensions can easily pass through the nozzle of an ink jet print head without clogging or agglomerating. Moreover, due to the high viscous oily or waxy solid consistency of the ink composition at room temperature (~25° C.), the crystallites remain embedded in the amorphous organic ligand matrix and do not tend to become agglomerated or form sediments during long periods of storage. Overbased metallic soaps also exhibit reduced viscosity when heated.

The metallic soap, which is preferably a metal carboxylate soap, acts as both the carrier vehicle and the source of the metal colorant in the ink composition used in the method according to the present invention. The metallic soap can also be used to carry other colorants and/or colorant precursors, such as metal hydroxides or carboxylates, pigments such as mixed transition metal oxides, mineralizers, and fluxes, which may or may not combine with the metal ion in the metallic soap to produce a mixed metal oxide pigment upon firing. One example is the use of a metallic soap consisting of cobalt octanoate having finely divided iron oxide dispersed therein which forms a mixed cobalt iron oxide upon firing. Another example is the use of a metallic soap consisting of chromium octanoate having finely divided $Sb_2O_3$ and $TiO_2$ blended into the waxy solid matrix to form a chromium-antimony-titanate buff upon firing. Yet another example is the use of a metallic soap consisting of calcium octanoate having finely divided $Cr_2O_3$ and $SnO_2$ dispersed therein in appropriate ratios so as to form a Ca—Cr—Sn pink pigment upon firing. Pending U.S. application Ser. No. 09/479,350, now U.S. Pat. No. 6,402,823 is hereby incorporated by reference in its entirety for its teachings relative to the combinations of metal ions that can be made to produce colors upon firing.

Because the ink compositions used in the method of the present invention are viscous oils or waxy solids at room temperature, the risk of agglomeration and/or sedimentation of solid particles and other additives is diminished as compared to ink compositions consisting of solutions of metallic salts dissolved in solvents. Moreover, there is very little risk of the precipitation of insoluble metal salts. Metals that are undesirable in soluble form due to the toxicity of the metal, such as antimony, cadmium, lead, nickel, and tin, can be used in the ink compositions in less toxic solid form, such as metal hydroxides or oxides. Similarly, the use of malodorous metal complexes, such as gold mercaptans for example, can also be avoided.

The temperature at which the ink composition forms a liquid phase having a viscosity of less than about 40 centipoise can be controlled or adjusted through choice of the carboxylic acids or ligand of the metallic soap. For example, the liquid phase transition temperature and viscosity of a metal stearate (C18), such as cobalt stearate, is higher than that of a shorter aliphatic metallic carboxylic acid, such as cobalt octanoate (C8). Obviously, the concentration of metal present per unit volume in the composition of the metal stearate (C18) would be lower than that in the respective metal octanoate (C8) of the same metal and oxidation state. The liquid phase transition temperature, metal loading, and viscosity of the ink composition can thus be controlled or adjusted through choice of the different carboxylate ligands, the degree of branching, saturation and unsaturation, aromatic or functional groups such as ketonic, alcoholic, aminic, amidic, and other functional groups present. Mixtures such as isomers having the same molecular weight, such as neodecanoic or isooctanoic acids, and combinations of different acids, such as a mixed octanoate/decanoate complexes can also be used. In addition, conventional rheology agents, such as surfactants, can also be blended into the metallic soap. Tall oil fatty acids, or slightly excess carboxylic acid, typically used to adjust the viscosity of metal soap compositions, can also be used to form an "acid" soap.

The steps of the method of the present invention comprising heating the ink composition to reduce its viscosity to less than about 40 centipoise and depositing micro-droplets of the heated ink composition upon the ceramic article are preferably accomplished using ink jet equipment designed to apply thermal hot melt organic vehicle systems and/or liquid metal solder systems onto various substrates. One example of a suitable ink jet print head is described in Ayers et al., U.S. Pat. No. 5,772,106, the specification of which is hereby incorporated by reference in its entirety. Ayers et al. discloses a self-contained print head with an internal reservoir and internal heating elements that raise the temperature of solder or other material above its melting point so that it can be deposited on the surface of an article in micro-droplets. Similarly, Hayes, U.S. Pat. No. 5,498,444, and Hayes et al., U.S. Pat. No. 5,707,684, both of which are hereby incorporated by reference in their entirety, also disclose ink jet printing apparatus for dispensing materials having a viscosity below about 40 centipoise when heated. As noted in these references, the viscosity of the dispensed materials can be adjusted by varying the dispensing temperature, and if the substrate on which the material is printed is maintained at a temperature below the melting point of the material, it will solidify upon cooling to the substrate temperature.

According to the method of the present invention, once the ink composition has been deposited upon the ceramic article, the ceramic article must be fired in an oxidizing atmosphere to decompose the ink composition and allow the metal ion of the metallic soap to oxidize and form a coloring oxide. Firing can be conducted in a conventional oven in an ambient air atmosphere. It will be appreciated that firing times and temperatures will vary depending upon the components in the ink composition and the composition of the ceramic article being decorated, but firing is generally conducted at a temperature of from about 600° C. to about 1400° C. for about 5 minutes to about 24 hours. It will be appreciated that firing times and temperatures will be based in large part upon the ceramic article being fired.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A method of decorating a ceramic article comprising:
   providing an ink composition comprising a metallic soap, said ink composition being a viscous oil or waxy solid at about 25° C.;
   heating said ink composition to reduce its viscosity to less than about 40 centipoise;
   depositing micro-droplets of said heated ink composition upon said ceramic article; and
   firing said ceramic article in an oxidizing atmosphere to decompose said ink composition and form a coloring oxide.

2. The method according to claim 1 wherein said ink composition comprises a blend of two or more different metallic soaps.

3. The method according to claim 1 wherein said metallic soap comprises a complex between an ion of a metal heavier than sodium and a ligand containing at least six carbon atoms.

4. The method according to claim 3 wherein said ligand containing at least six carbon atoms is a carboxylate.

5. The method according to claim 4 wherein said carboxylate is selected from the group consisting of hexanoates, heptanoates, octanoates, nonanoates, decanoates, 2-ethylhexanoates, resinates, stearates, and laurates.

6. The method according to claim 1 wherein said ink composition is solvent-free.

7. The method according to claim 1 wherein said ink composition upon heating becomes a flowable liquid having a viscosity of less than about 20 centipoise.

8. The method according to claim 1 wherein said metallic soap is overbased.

9. The method according to claim 1 wherein said ink composition comprises an "acid" soap.

10. The method according to claim 1 wherein said ink composition further comprises one or more colorants and/or colorant precursors.

11. The method according to claim 10 wherein said colorants and/or colorant precursors are selected from the group consisting of metal hydroxides, metal carboxylates, transition metal oxides, mineralizers, and fluxes.

12. A method of decorating a ceramic article comprising:
    providing an ink composition that is a viscous oil or waxy solid at about 25° C., said ink composition comprising at least one metallic soap and at least one colorant and/or colorant precursor selected from the group consisting of pigments, metal hydroxides, metal carboxylates, transition metal oxides, mineralizers, and fluxes;
    heating said ink composition to reduce its viscosity to less than about 40 centipoise;
    depositing micro-droplets of said heated ink composition upon said ceramic article; and
    firing said ceramic article in an oxidizing atmosphere to decompose said ink composition and form a coloring oxide.

* * * * *